United States Patent
Wooderson et al.

(10) Patent No.: US 6,669,047 B2
(45) Date of Patent: Dec. 30, 2003

(54) BUTTON ACTUATED PRESSURE RELEASED AND LOCKING DEVICES FOR PRESSURE COOKERS

(75) Inventors: Blaise M. Wooderson, Olathe, KS (US); Frederick A. Rose, Overland Park, KS (US)

(73) Assignee: Innovation IP Holding Co, Davenport, IA (US)

( * ) Notice: Subject to any disclaimer, the term of this patent is extended or adjusted under 35 U.S.C. 154(b) by 61 days.

(21) Appl. No.: 09/683,398

(22) Filed: Dec. 21, 2001

(65) Prior Publication Data

US 2003/0116578 A1 Jun. 26, 2003

(51) Int. Cl.[7] .............................................. B65D 83/70
(52) U.S. Cl. ................. 220/316; 220/367.1; 220/231; 220/912; 220/203.29; 220/203.27; 292/DIG. 37
(58) Field of Search ........................... 220/316, 367.1, 220/231, 361, 203.04, 203.09, 203.22, 203.23, 240, 203.27; 99/403, 337, 340; 219/440; 292/DIG. 37, 256, 256.5, 179, 180

(56) References Cited

U.S. PATENT DOCUMENTS

| | | | |
|---|---|---|---|
| 3,559,839 A | | 2/1971 | Seethaler |
| 3,973,694 A | * | 8/1976 | Tess ...................... 220/203.06 |
| 4,103,801 A | | 8/1978 | Walker |
| 4,251,007 A | * | 2/1981 | Behnisch ................ 220/316 |
| 4,257,394 A | | 3/1981 | Zabel |
| 4,294,377 A | | 10/1981 | Chen |
| 4,423,825 A | * | 1/1984 | Baugarten ................ 220/316 |
| 4,512,495 A | | 4/1985 | Bauer et al. |
| 4,541,543 A | * | 9/1985 | Elexpuru ................ 220/316 |
| 4,620,643 A | * | 11/1986 | Sebillotte ............... 220/316 |
| 4,717,041 A | * | 1/1988 | Elexpuru ................ 220/316 |
| 4,735,192 A | | 4/1988 | Demeyere |
| 4,840,287 A | | 6/1989 | Brewer et al. |
| 4,932,550 A | | 6/1990 | Moucha |
| 5,370,257 A | | 12/1994 | Chameroy et al. |
| 5,370,259 A | | 12/1994 | Cartigny |
| 6,067,896 A | | 5/2000 | Elorza |
| 6,105,808 A | | 8/2000 | Mendonca |
| 6,135,013 A | | 10/2000 | Barrena |
| 6,257,124 B1 | | 7/2001 | Chen |

FOREIGN PATENT DOCUMENTS

DE 3811675 1/1989

* cited by examiner

Primary Examiner—Lee Young
Assistant Examiner—James Smalley
(74) Attorney, Agent, or Firm—Gerald M. Kraai

(57) ABSTRACT

A pressure cooker handle assembly that relieves pressure in the cooker and unlocks the lid by pushing a single button twice. The button includes a tab that directly activates a pressure relief valve to release the pressure and a leg that depresses a stopbar to unlock the lid. Pressing of the button a first time releases the pressure in the cooker, but does not unlock the lid. A latch system prevents the cooker from again building pressure once the button is pressed. When the button is pressed a second time the leg depresses the stopbar to unlock the lid from the cooker.

10 Claims, 5 Drawing Sheets

BUTTON ACTUATED PRESSURE RELEASED AND LOCKING DEVICES FOR PRESSURE COOKERS

FIELD OF INVENTION AND BACKGROUND OF INVENTION AND PRIOR ART

This invention relates to a safety pressure release mechanism and a safety lock for pressure cookers.

The prior art discloses a variety of locking and pressure release mechanisms for pressure cookers. For example, Sebillotte U.S. Pat. No. 4,620,643 discloses a manually actuated safety device to prevent closure of a pressure valve if the handles of the cooker are not in the closed position and prevent opening of the lid when both the handles and the pressure valve are in a closed position. Chen U.S. Pat. No. 4,294,377 discloses a coupling steel ring and spring band on the cover of a pressure cooker that prevents the pressure in the cooker from exceeding a predetermined saturated pressure, thus keeping the pressure in the cooker constant. Brewer U.S. Pat. No. 4,840,287 discloses a pressure cooker locking mechanism having a camshaft assembly that prevents the cooker lid from being locked if the camshaft is not fully extended; a pressure responsive safety mechanism is also provided to prevent the opening of the locking mechanism when the cooker is under pressure.

Additional examples include Moucha U.S. Pat. No. 4,932,550, which discloses an interlock structure that prevents pressurization of the cooker if the lid is not securely attached to the cooker and prevents removal of the lid until the pressure in the cooker has dropped below a preset maximum. Seethaler U.S. Pat. No. 3,559,839 discloses a pressure cooker that is opened and closed by the rotation of upper and lower handles; the lower handle has a heat expandable element that urges a lock pin into a slot in the upper handle so that the cooker cannot be opened until the temperature has been lowered to a selected value and the lock pin has retracted from the slot.

Further, in Walker U.S. Pat. No. 4,103,801 the pressure cooker has a slidably mounted, manually operated lock member that must be unlocked in order to open the cover. Pressure in the cooker urges the stem of a sealing plug in the cover of the cooker upwardly and into engagement with the lock member when the handles are properly aligned and pressure builds in the cooker, thus preventing the cooker from being opened until the pressure decreases. A similar safety button is shown in the lid of Chen U.S. Pat. No. 6,257,124; when the cooker is under pressure, the safety button is positioned such that the lid cannot be manually opened. Zabel U.S. Pat. No. 4,257,394 discloses locking means connected with flanges in the lid and cooker body such that the lid will not rotate when the cooker is pressurized; a spring actuated relief valve is connected to a timer so that pressure is maintained in the cooker for a predetermined period of time after which the lid can be removed. In Demeyere U.S. Pat. No. 4,735,192 the cooker cannot be opened until the operator manipulates a knob, the movement of the stem of which allows a pin or peg to push a seal ring away from its seats, thus depressurizing the cooker and allowing the lid to be removed.

In Mendonca U.S. Pat. No. 6,105,808 a pop up valve prevents the lid from being turned to open the cooker when it is under pressure; the pop up valve also prevents pressure from building in the cooker if the lid is not properly installed on the cooker. Similarly, in Barrena U.S. Pat. No. 6,135,013 a valve remains in the up position when the cooker is pressurized and prevents a locking member from being released, and, in Elorza U.S. Pat. No. 6,067,896 a valve must drop in order to permit the lid to be opened. In Chameroy U.S. Pat. No. 5,370,259 the lid is sealed to the cooker via lock jaws; pressure developed during cooking is transmitted to internal faces of the lid, causing the lid and lock jaws to be forced together so that the lid cannot be removed until the internal pressure is reduced, and, in Chameroy U.S. Pat. No. 5,370,257, the cooker cannot be opened under pressure because a flow limiting valve, then in an up position, prevents the sliding of a latch or bolt that is necessary to open the cooker.

None of the prior art devices or patents, however, appear to provide: a simple guided means to reliably and safely install and lock the lid in sealing engagement on the cooker; simple, single-button means to relieve the pressure in the cooker, prevent the cooker from re-pressurizing, and unlock the lid of the cooker; means to automatically reset the various safety and convenience features of the cooker during the installation and removal of the lid of the cooker; positive latch means that allow an operator to perform other tasks while the cooker is depressurizing; means to automatically lock the lid on the cooker as it is being placed on the cooker; and means to make such a the cooker without the use of timers, pressure sensitive materials or parts, heat sensitive materials or parts, or moving parts that are preset to predetermined tolerances, pressure levels, heat levels, or weight levels so that they operate properly during pressurization and depressurization of the cooker.

SUMMARY OF INVENTION

The inventive cooker handle assembly contains an automatic pressure release system that allows the operator to press a button a first time—i.e., down to a first level—in order to relieve the pressure in the cooker. Once the button is pressed down to the first level, a latch arrangement prevents the button from returning to its up position and, thus, prevents pressure from again building in the cooker. The latch arrangement must be reset in order to allow pressure to again build in the cooker, and, in order to reset the latch arrangement, the lid must be removed from, and then replaced on, the pot. Thus, the operator need not tend the cooker or continue to press the button in order to fully depressurize the cooker, but, may, instead perform other tasks while the pressure is being relieved.

Nevertheless, when the button is pressed to the first level, the lid is still locked on the pot and cannot be removed. In order to remove the lid from the pot, the same button must be pressed a second time, or downward to a second level, and held in the second position while the lid is removed. Premature removal of the lid from the pot is resisted by flanges on the lid and pot. The flanges are held tightly together when there is pressure in the cooker, which makes it difficult to rotate the lid off of the pot while the cooker is pressurized. The lid may be easily removed, however, when the cooker is depressurized, and the flanges are not as tightly held together.

The inventive handle assembly has upper and lower locking handles that are rotated into and out of alignment in order to, respectively lock and unlock the lid to the pot of the cooker. The upper handle is attached to the lid. The lower handle is attached to the pot. When the lid is rotated on the pot, a guide groove and spring-biased guide post in the handle assembly cooperate to guide the lid into a locked and sealed position on the pot and, simultaneously, set the latch arrangement so that pressure can build in the cooker. In addition, as the lid is being rotated on the pot, a spring-biased stopbar in the lower handle is pressed downward into a slot in the lower handle, allowing the upper handle and lid to rotate to the sealed position on the pot. However, when the lid reaches its sealed position, the spring-biased stopbar pops up into a slot in the upper handle and locks the lid on the pot.

The guidepost that guides the lid into a locked and sealed position is part of a lock guide that is housed and secured in an internal cavity in the upper handle of the cooker. The lock guide has an outward extending spring-biased spring post, an inward extending push post, and laterally extending latch dogs, as well as the downward extending guidepost. The downward extending guidepost extends down beyond the bottom of the upper handle and is aligned above and cooperates with the guide groove that is formed in the lower handle. The inward extending push post is aligned with a hole in the rim of the pot.

The upper handle also has an upper opening that receives and houses a button that is used to activate various features of the inventive handle. The button has, on its lower side, a downward extending, rounded tab that is aligned generally above a plunger or pin of a pressure relief valve that is installed in the lid. The button also has flexible, downward extending legs. The downward extending legs have latch arms that extend laterally from the sides of the legs. One of the downward extending legs of the button is longer than the other leg. The longer leg of the button is aligned immediately above the stopbar in the lower handle.

As the lid is rotated on the pot, the guidepost of the lock guide slides along a curved edge of the guide groove. As the guidepost slides along the curved edge of the guide groove, the lock guide in the upper handle is forced outward against the bias of the spring on the spring post of the lock guide. When the lid is fully rotated into its sealed position on the pot, the lock guide is positioned such that its laterally extending latch dogs are aligned below the laterally extending latch arms on the downward extending legs of the button.

When the button is pressed down the first time, or to its first level, the latch arms on the legs of the button are forced around and under the latch dogs of the latch guide and the downward extending, rounded tab of the button contacts and moves the pin or plunger of the safety relief valve, causing pressurized air and steam air to begin escaping from and depressurizing the cooker. In this position, the latch dogs of the latch guide are directly above the latch arms of the legs of the button and block the upward movement of the latch arms on the latch arms, thus preventing the button from returning to its up position and, in turn, preventing the rounded tab from moving out of contact with the pin or plunger of the safety relief valve. Accordingly, when the button is pressed once and is in its first position, the safety relief valve remains activated and does not permit pressure to be rebuilt in the cooker.

After the cooker is depressurized, the button is pressed down again, or to its second level. As the button is pressed down farther, the longer leg of the button comes into contact with the stopbar that is extended into the upper handle and pushes the stopbar down into its slot in the lower handle as long as the button is continuously pressed downward at the second level. When the stopbar is pressed down into its slot, the lid is unlocked and may be rotated back out of sealed engagement with the pot by rotating it in the opposite direction. As the lid is rotated in the opposite direction, the lower surface of the upper handle prevents the stopbar from moving upward, and the guidepost of the lock guide reverses it path along the curved edge of the guide groove of the lower handle. As the guidepost slides along the curved edge of the guide groove, the spring associated with the spring post of the lock guide biases and moves the lock guide inward. As the lock guide moves back inward, the latch dogs move out of alignment with the latch arms of the legs of the button and the button is permitted to move back to its up position. Thus, it is only when the lid is rotated off the pot that the latch arms of the legs of the button can be reset to a position above the latch dogs of the lock guide. When the lid is rotated sufficiently so that the lid and pot flanges are no longer one above the other, the lid may be removed from the pot.

In order to remove the lid from the cooker, the button must be pressed a second time. When the button is pressed a second time, the latch system permits a downward extending leg of the button mechanically depressing the stopbar into its housing slot to permit the lid to be rotated off of the cooker.

DETAILED DESCRIPTION

The following convention is used in describing various directions with respect to the inventive cooker. The cooker is assumed to be setting on a counter or other surface in an upright position for normal use. When the cooker is in this upright, normal orientation, the following terms have the following meanings: The terms "up" or "upward" mean the vertical direction extending from the bottom of the cooker toward the top of the cooker and beyond; the terms "down" or "downward" mean the vertical direction that is the opposite of the "up" or "upward" direction—i.e., the vertical direction extending from the top of the cooker toward the bottom of the cooker; the terms "in" or "inward" means the horizontal direction from the periphery or side of the cooker toward the center of the cooker; and the terms "out" or "outward" means the opposite horizontal direction—i.e., the direction from the center of the pot toward the periphery or side of the cooker. If a part or object is "above" another part or object, the part or object is in a position or location that is in the upward direction from the other part or object; thus, the lid of the cooker is above the bottom of the pot of the cooker when the cooker is in its normal upright position; similarly if a part or object is "below" another part or object, the part or object is in a position that is in the downward direction from the other part or object; thus, the bottom of the cooker is below the lid of the cooker when the cooker is in its normal upright position.

Figure 1:
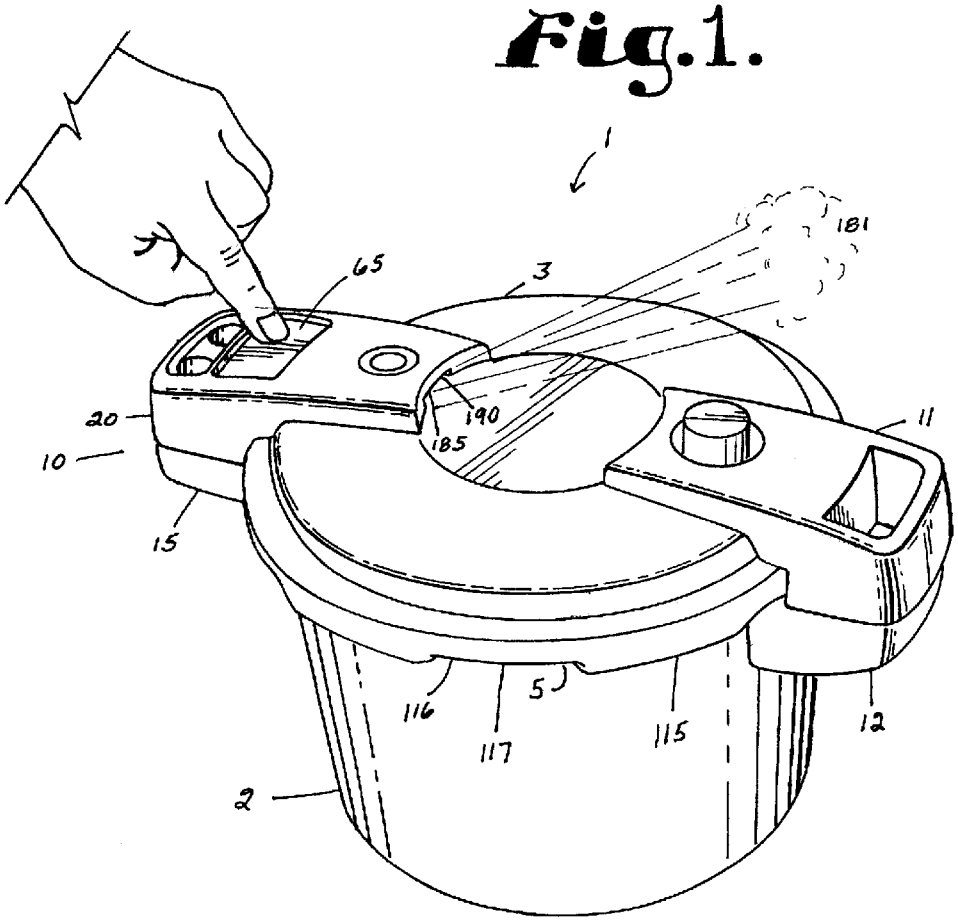
FIG. 1 is a perspective view of a pressure cooker including a handle assembly embodying the present invention and showing pressure being released from the cooker.

As shown in FIG. 1, pressure cooker 1 has a pot 2 and a lid 3. The pot 2 has an outwardly extending rim 4, which has outward extending flanges 5 spaced around its circumference. The outward extending flanges 5 have lower surfaces 6.

The cooker 1 has a locking handle assembly 10 and side handles 11 and 12. The locking handle 10 comprises a lower locking handle 15 and an upper locking handle 20. The lower locking handle 15 is attached to the pot 2, and the upper locking handle 20 is attached to the lid 3 such that, when the cooker is in use, upper locking handle 20 is positioned immediately above lower locking handle 15, as shown in FIGS. 1, 4 and 5.

Figure 9:
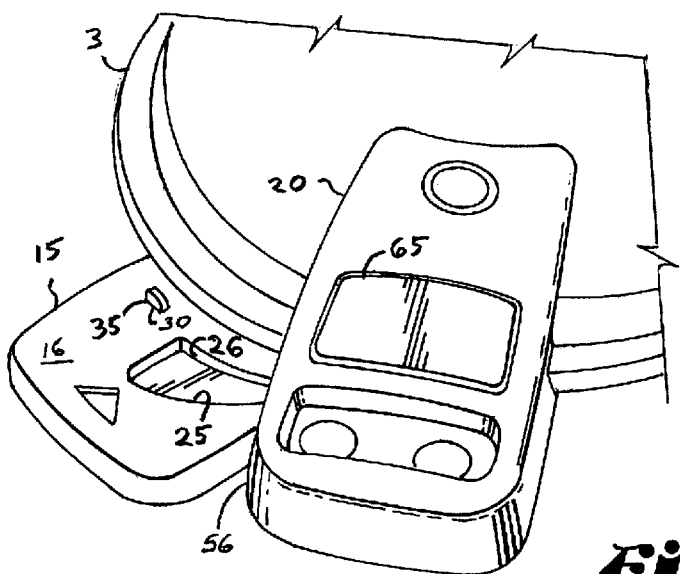
FIG. 9 is a fragmentary perspective view of the pressure cooker showing the upper handle rotated away from the lower handle.

As shown in FIG. 9, the lower locking handle 15 is formed with a top surface 16, a guide groove 25 with a curved edge or cam surface 26, and a slot 30. A stopbar 35 having an upper portion 40 is positioned within, and spring-biased upward through, the slot 30 so that the upper portion 40 of the stopbar 35 is above the top surface 16 of the lower locking handle 15. The upper portion of the stopbar 35 has a curved or corner 41 and a squared edge or corner 42.

Figure 3:
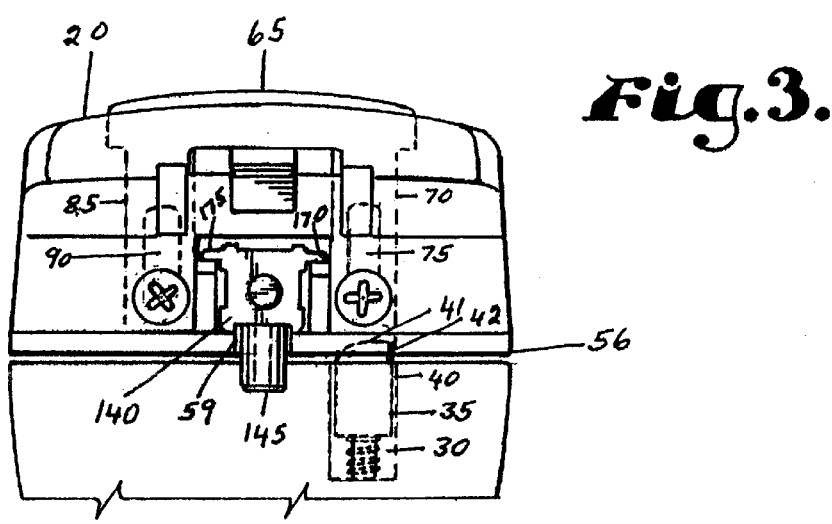
FIG. 3 is an end view of the handle assembly in the latched position with the button and stopbar thereof shown in hidden lines.
Figure 4:
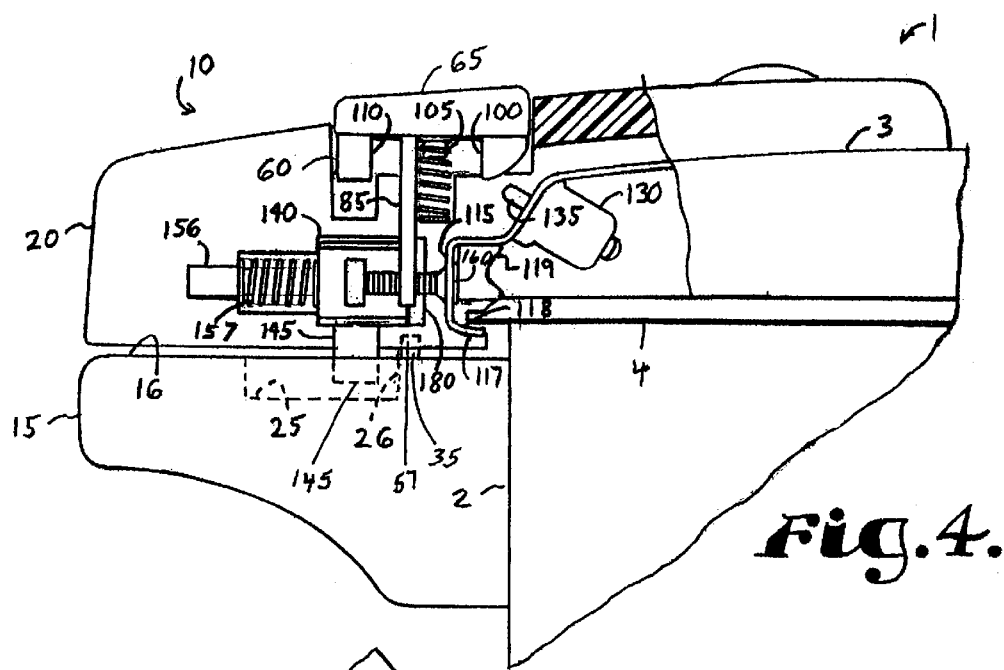
FIG. 4 is a fragmentary side view of the pressure cooker and handle assembly with the handle assembly in the latched position.
Figure 5:
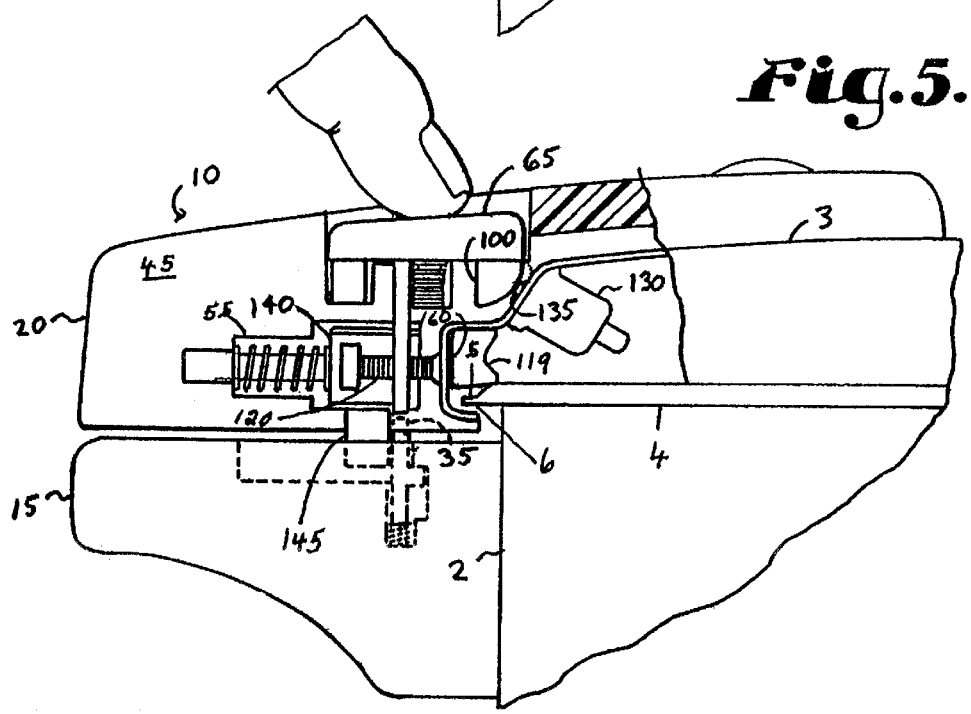
FIG. 5 is a fragmentary side view of the pressure cooker and handle assembly with the handle assembly in the pressure release position.

As shown in FIGS. 3, 4, and 5, the upper locking handle 20 comprises a housing 45 that has an interior cavity 55, a lower edge 56, a bottom slot 57 with a right most inner side 58, a elongated slot 59, and an upper opening 60. A spring-biased button 65 fits moveably within the upper opening 60 of the upper handle 20 and is spring-biased in an upward position. The button 65 has a downward extending leg 70, which has a lower end 71, forms an oval slot 75, and a laterally extending latch arm 80. The button 65 also has a downward extending leg 85, which forms an oval slot 90 and has a laterally extending latch arm 95. The downward extending leg 70 is longer than the downward extending leg 85 and is positioned on the button 65 so that when the upper locking handle 20 is immediately above the lower locking handle 15, the leg 70 is immediately above the spring-biased stopbar 35 in the lower handle 15. It is preferable to make the downward extending legs 70 and 85 of material that is somewhat flexible. The button 65 also has a downward extending rounded tab 100, a downward extending post 105, and a downward extending block 110.

As shown in FIGS. 4 and 5, the lid 3 has a downwardly extending rim 115 having scalloped portions 116, the lower ends 117 of which are bent inward approximately 90 degrees so that the lower bent ends 117 of the scalloped potions 116 are substantially horizontal and parallel to the flanges 5 around the circumference of the rim 4 of the pot 2 when the lid 3 is on the pot 2. In this orientation, the lower bent ends 117 have upper surfaces 118. A flexible seal 119 fits immediately inside the downward extending rim 115 and sits on top of the outwardly extending rim 4 of the pot 2. Posts 120 and 125 are attached to the rim 115 proximate the upper handle 20 so that the posts 120 and 125 extend outward from the rim 115 and through the oval slots 75 and 80, respectively, of the downward extending legs 70 and 75 of the button 65 of the upper handle 20. A safety relief valve 130 is secured in the lid 3 proximate the upper handle 20 so that an activation plunger 135 of the safety relief valve 130 extends at outward and upward through the lid 3 or the rim 115 of the lid 3.

Figure 2:
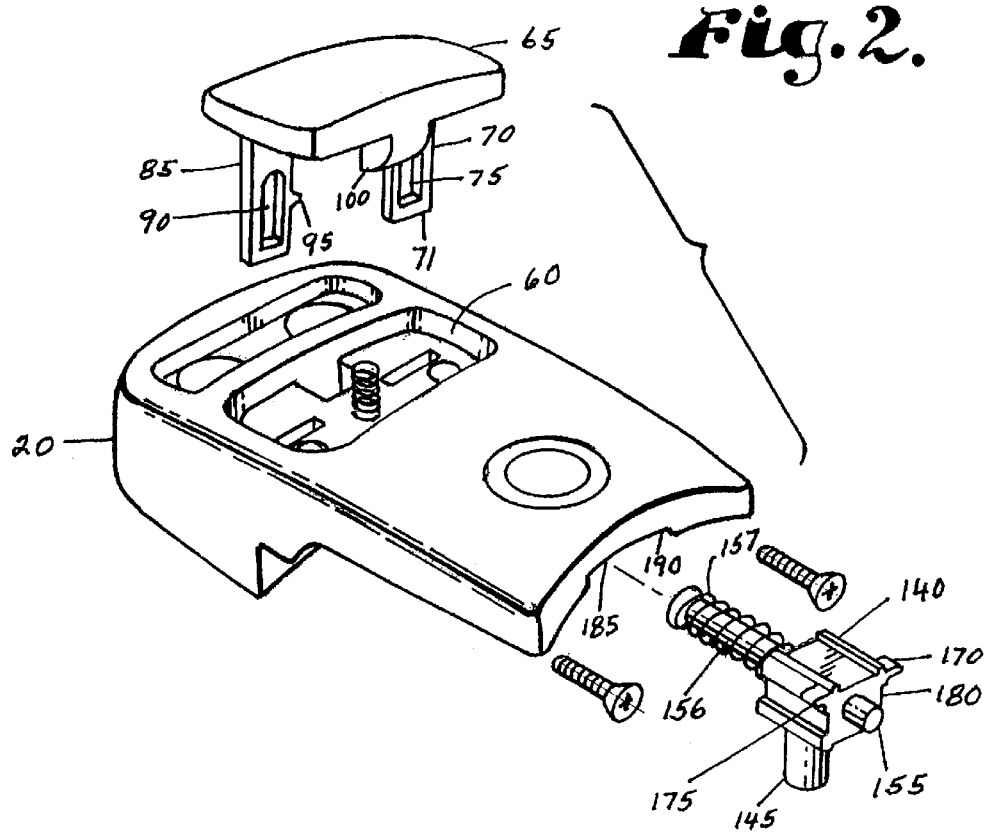
FIG. 2 is an exploded perspective view of the upper handle of the handle assembly.

As shown in FIGS. 2, 4, and 5, a lockguide 140 is moveably positioned within the interior cavity 55 of the upper handle 20. The lockguide 140 has a downward extending guidepost 145 that extends downward through the elongated slot 59 of the upper handle 20. The lockguide 140 also has a horizontal inward extending push post 155 and a horizontal outward extending spring post 156. The lockguide 140 is spring biased by a spring 157 which is inserted over and around the outward extending spring post 156 so that the push post 155 is spring biased inward and, when the lid 3 is not installed on the pot 2, extends through a hole 160 in the rim 115 of the lid 3 and abuts the flexible seal 119 inside the downwardly extending rim 115 of the lid 3. In addition, the lockguide 140 has latchdogs 170 and 175 extending from each side of an end 180 of the lockguide 140.

Figure 6:
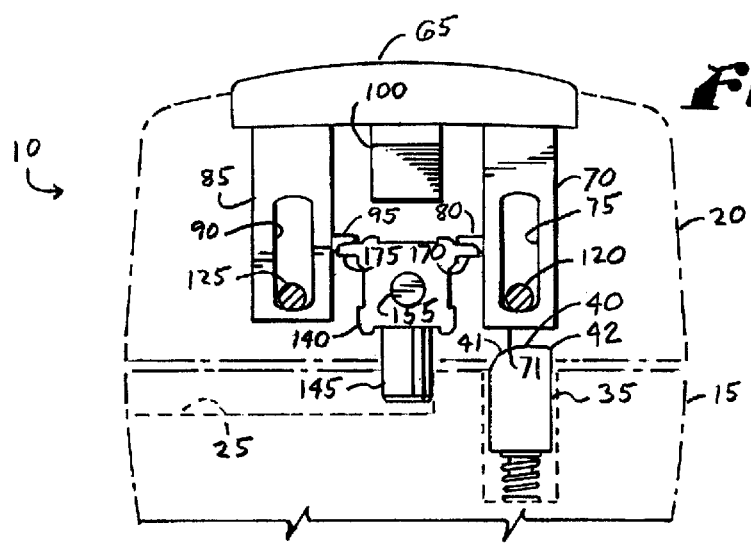
FIG. 6 is an end view of the handle assembly in the latched position with the bodies of the upper and lower handles shown in phantom lines.

As shown in FIGS. 4 and 6, when the lid 3 is not secured to the pot 2, the stopbar 35 of the lower handle 15 is biased upward, the push post 155 and the lockguide 140 (of which push post 155 is a part) are biased inward, and the button 65 is biased upward.

In order to secure the lid 3 to the pot 2, the lid 3 is registered with and placed upon the outward extending rim of the pot 2 and rotated clockwise until the upper locking handle 20 is positioned immediately above the lower locking handle 15. When the lid 3 is rotated on the pot 2, the upper surfaces 118 of the lower bent ends 117 or the scalloped portions 116 of the lid 3 are in sliding contact with the lower surfaces 6 of the flanges 5 of the rim 4 of the pot 2. See FIGS. 4 and 5. When there is pressure in the cooker 1, the lid 3 is subject to an upward force caused by the pressure in the cooker. This upward force is resisted by the contact between the upper surfaces 118 of the lower bent ends 117 of the scalloped portions 116 of the lid 3 and the lower surfaces 6 of the flanges 5 on the rim 4 of the pot 2, which not only keeps the lid 3 on the pot 2, but also makes it very difficult to rotate the lid 3 when there is pressure in the cooker 1 due to the increased upward force of the upper surfaces 118 of the lower bent ends 117 on the lower surfaces 6 of the flanges 5.

As the lid 3 is rotated clockwise around the outwardly extending rim 4 of the pot 2, the downward extending guide 145 of the lockguide 140 slides along the curved edge 26 of the guide groove 25 to keep the lid 3 in register with the outwardly extending rim 4 of the pot 2. (See FIG. 9) As the downward extending guide 145 of the lockguide 140 slides along the curved edge 26 of the guide groove 25, the downward extending guide 145, and with it the lock guide 140, is moved outward against the bias of the spring 157 on the spring post 156. When lockguide 140 has moved outward, the latchdogs 170 and 175 of the lockguide 140 are positioned directly below or under the latch arms 80 and 95 of the downward extending legs 70 and 85, respectively, of the button 65, as shown in FIG. 6.

Also, as the lid 3 is rotated clockwise, the lower edge 56 of the upper locking handle 20 contacts and slides over the rounded edge 41 of the stopbar 35, causing the spring-biased stopbar 35 to move downward into the slot 30 and allowing the upper locking handle 20 to continue to rotated clockwise until it is immediately above the lower locking handle 15. (See FIGS. 6 and 9) However, when the upper locking handle 20 is immediately above the lower locking handle 15, the spring-biased stop guide 35 is directly below the bottom slot 57 of the upper locking handle 20, allowing the stopbar 35 to be spring-biased upward into the bottom slot 57 of the upper locking handle 20, as shown in FIG. 6. When the stopbar 35 is spring-biased upward into and within the bottom slot 57, the upper locking handle cannot rotate, and, more specifically, cannot rotate counterclockwise to an open position, because, if such rotation is attempted, the squared edge or corner 42 of the stopbar 35 comes into contact with the right most inner side 58 of the bottom slot 57, preventing such movement. Thus, when the stopbar 35 is biased upward into the slot 57 of the upper locking handle 20, the lid 3 is locked on the pot 2.

When the lid 3 is so locked on the pot 2, the lid 3, with the aid of the flexible seal 119, is sealed on the pot 2 so that the contents of the pot 2 may be heated and cooking can begin inside the pot 2. As the contents (typically water and food) of the sealed pot 2 are heated, the temperature and pressure inside the pot 2 rises, steam may be produced, and the contents of the pot 2 become very hot.

In order to remove the lid 3 without a rapid and potentially dangerous escape of the steam and the hot contents of the pot 2, it is necessary to reduce the pressure inside the pot 2.

Figure 7:
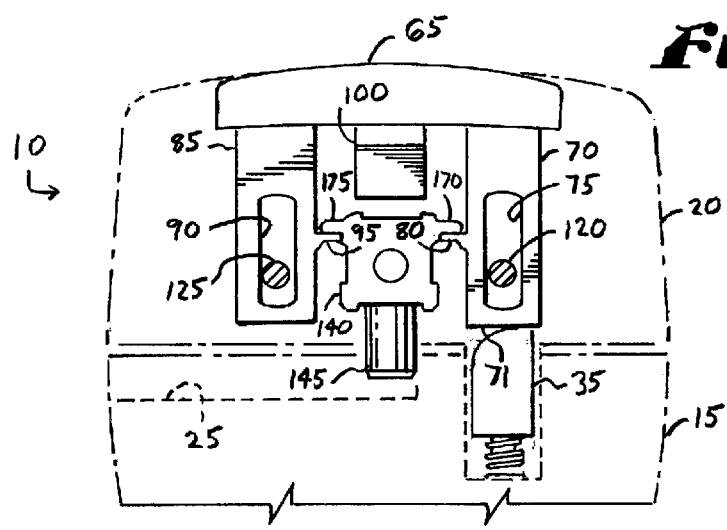
FIG. 7 is an end view of the handle assembly in the pressure release position with the bodies of the upper and lower handles shown in phantom lines.

In order to reduce the pressure in the pot 2, the button 65 is pushed downward. As the button 65 is pushed downward, the latch arms 80 and 95 of the flexible downward extending legs 70 and 85 of the button 65 slidingly pass or snap by the latchdogs 170 and 175 of the lockguide 140. When the latch arms 80 and 95 have slidingly snapped or passed downward by the latch dogs 140, the upwardly spring-biased button 65 is at a first downward position, as shown in FIG. 7. In this position, the latchdogs 170 and 175 prevent the upwardly spring-biased button 65 from returning to the up position (FIG. 6), because, although the button 65 is biased upward, the latch dogs 170 and 175 of the lockguide 140 are then directly above the latch arms 80 and 95 of the legs 70 and 85 of the button 65 and prevent the latch arms 80 and 95 from passing by the latch dogs 170 and 175, thus keeping the button 65 in its first downward position and preventing it from returning to its original upward position.

As shown in FIGS. 5 and 7, when the button 65 is pushed downward to its first downward position, the rounded tab 100 of the of the button 65 comes into contact with the activation pin or plunger 135 of the safety relief valve 130, activating the valve and reducing the pressure inside the pot 2. When the safety relief valve 130 is activated, steam 181 escapes through the valve 130 into a channel 185 in the upper handle 20, and escapes to the atmosphere through a vent 190 at the end of the channel 185 in the upper handle 20.

Moreover, since the rounded tab 100 of the button 65 comes into contact with the pin or plunger 135 to activate the safety relief valve 130 when the button is in its first downward position, and since the latch dogs 170 and 175 keep the button in its first downward position once the button 65 is pressed downward, it will be noted that the tab 100 also remains in contact with the pin or plunger 135 and continues to activate the safety relief valve 130 once the button 65 is pressed downward to its first downward position. Thus, as shown in FIGS. 5 and 7, the latch dogs 170 and 175 also prevent the safety relief valve 130 from being deactivated (and allowing pressure to again build in the pot 2) even if the button 65 is not continually pressed downward. Thus, an operator simply need press button 65 once to relieve pressure in the pot 2.

Nevertheless, when the button 65 is in its first downward position, the lid 3 still cannot be removed from the pot 2. This is so because, as shown in FIG. 7, when the button 65 is in the first downward position, the stopbar 30 is still spring-biased upward into the bottom slot 57 of upper handle 20, and, accordingly, the lid 3 cannot rotate and is locked on the pot 2.

Figure 8:
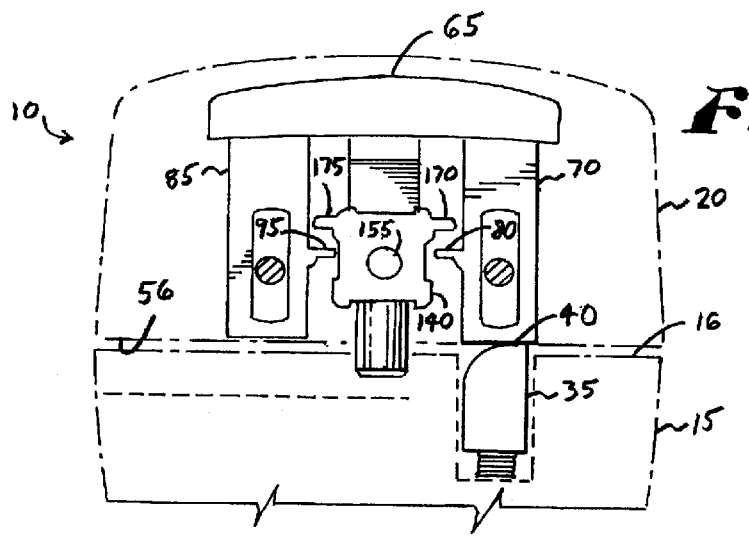
FIG. 8 is an end view of the handle assembly in the latch released position with the bodies of the upper and lower handles shown in phantom lines.

In order to unlock and remove the lid 3 from the pot 2, the button 65 must be pushed downward farther, or pushed downward a second time if the operator has ceased pressing on the button 65 after it is in the first downward position. As shown in FIG. 8, when the button 65 is pushed down farther (or a second time) the lower end 71 of the longer downward extending leg 70 of the button 65 comes into contact with the upper portion 40 of the stopbar 35 and forces the upwardly spring-biased stopbar 30 downward into the slot 30 against the spring biasing of stopbar 35. When the downward extending leg 70 has pushed the stopbar down into the slot 30 the button 65 is in a second downward position. When the button 65 is in its second downward position and the stopbar 35 has been forced downward into the slot 30, the squared edge or corner 42 of the upper portion of stopbar 35 is no longer an obstacle to the counterclockwise movement of the lid 3, and the lid 3 can be rotated and removed from the pot 2, provided the operator continues to press down on the button 65 to maintain it in its second downward position. The button 65 must be maintained in its second downward position by continued pressing on the button, because the button 65 is spring-biased upward. If the button 65 is not continuously pressed, the upwardly spring-biased button 65 will return to its first downward position (but will not return to its original position due to the position of the latch dogs 170 and 175 above the latch arms 80 and 95), and the spring-biased stopbar 35 will be biased up into the slot 57, thus relocking the lid 3. Thus, downward force must be maintained on the button 65 in order to rotate the lid 3 and remove it from the pot 2.

It will be noted that, when there is pressure in the cooker 1, the upward force on the lid 3 is resisted by the contact between the upper surfaces 118 of the lower bent ends 117 of the scalloped portions 116 of the lid 3 and the lower surfaces 6 of the flanges 5 on the rim 4 of the pot 2. (See FIGS. 4 and 5) As noted above this resistance not only keeps the lid 3 on the pot 2, but also makes it very difficult to rotate the lid 3 when there is pressure in the cooker 1 due to the increased upward force of the upper surfaces 118 of the lower bent ends 117 on the lower surfaces 6 of the flanges 5. Any attempt to remove of the lid 3 from the pot 2 by pressing the button 65 to its second downward position and rotating the lid 3 before the pressure in the cooker 1 has been fully relieved will be strongly resisted by the increased force of the upper surfaces 118 of the lower bent ends 117 of the scalloped portions 116 of the lid 3 on the lower surfaces 6 of the flanges 5 on the rim 4 of the pot 2. Thus, premature removal of the lid 3 from the pot 2 is significantly more difficult than removal of the lid 3 when the pressure in the cooker 1 has been fully relieved; and the premature removal of the lid 3 from the pot 2, as well as the potentially dangerous results associated with such premature removal, are much less likely in the inventive cooker 1.

In order to use the cooker 1, food and other cooking materials are placed in the pot 2. The lid 3 is then placed on the pot 2 with the upper locking handle 20 to the right of (or in a counterclockwise direction from) the lower locking handle 15. The lid 3 is then rotated in a clockwise direction.

As the lid 3 is so rotated on the pot 2, the following occur:

(a) the guidepost 145 of the inwardly spring-biased lock guide 140 in the upper handle 20 slides along the curved edge 26 of the guide groove 25 in the lower handle 15, and, as the guidepost 145 slides along the curved edge 26 of the guide groove 25, the lock guide 140 is forced outward (See FIGS. 5 and 9);

(b) the upper surfaces 118 of the lower bent ends 117 of the scalloped portions 116 of the lid 3 are in sliding contact with the lower surfaces 6 of the flanges 5 of the rim 4 of the pot 2, as shown in FIGS. 4 and 5;

(c) the inwardly biased push post 155 of the lockguide 140 has been forced outward and no longer extends inward through the hole 160 in the rim 115 of the lid 3; and (d) the lower edge 56 of the upper locking handle 20 contacts and slides over the rounded edge 41 of the stopbar 35, causing the spring-biased stopbar 35 to move downward into the slot 30 and allowing the upper locking handle 20 to continue to rotated clockwise toward a position where the upper locking handle 20 is immediately above the lower locking handle 15, as shown in FIGS. 4 and 6; When the upper locking handle 20 has been rotated to a position directly above the lower locking handle 15, the following takes place or pertains:

(e) the spring-biased stopbar 35 is positioned directly below the bottom slot 57 of the upper locking handle 20, and the stopbar 35 is biased upward into the bottom slot 57, locking the lid 3 on the pot 2, as shown in FIG. 6;

(f) the latchdogs 170 and 175 of the lockguide 140 are positioned directly below the latch arms 80 and 95 of the downward extending legs 70 and 85, respectively, of the button 65, as shown in FIG. 6;

(g) the upper surfaces 118 of the lower bent ends 117 of the scalloped portions 116 of the lid 3 are in contact with the lower surfaces 6 of the flanges 5 of the rim 4 of the pot 2, as shown in FIGS. 4 and 5; and (h) the lid 3 is sealed on the pot 2, and cooker 1 may be heated to cook its food or other contents.

As the cooker 1 is heated, the following occur:

(i) the pressure in the pot 2 rises, creating an upward force on the lid 3 that is resisted by the lower surfaces 6 of the flanges 5 on the rim 4 of the pot 2 which are immediately above and in contact with the upper surfaces 118 of the lower bent ends 117 of the scalloped portions 116 of the lid 3, thus keeping the lid 3 on the pot 2; and (j) steam and pressurized air are created in the cooker 1 and are, in part, prevented from escaping from the cooker 1 by the flexible seal 119.

When the heating and cooking of the cooker 1 have been completed, the button 65 is pressed down, whereupon, the following occurs or pertains:

(k) the latch arms 80 and 95 of the flexible downward extending legs 70 and 85 of the button 65 slidingly snap by and past the latchdogs 170 and 175 of the lockguide 140, placing the button in its first downward position (FIG. 7), after which the latch dogs 170 and 175 are immediately above the larch arms 80 and 95 and prevent the upward return of the latch arms 80 and 95 to their position above the latch dogs 170 and 175, which, in turn, prevents the button 65 from returning to its original position in the upper opening 60 of the upper handle 20;

(l) as shown in FIG. 5, the rounded tab 100 of the of the button 65 comes into contact with the activation pin or plunger 135 of the safety relief valve 130, activating the valve and reducing the pressure inside the pot 2 by allowing the steam 180 and pressurized air to pass through the valve 130 into the channel 185 in the upper handle 20 and escape to the atmosphere through the vent 190 at the end of the channel 185 in the upper handle 20; due to the position of the latch dogs 170 and 175 directly above the larch arms 80 and 95, the latch arms 170 and 175 cannot return to their position above latch dogs 170 and 175, and the button 65 cannot return to its original position above its first downward position; accordingly, the tab 100 remains in contact with the plunger or pin 135 of the safety relief valve 130, and the safety relief valve remains activated until the cooker 1 is fully depressurized and the steam the cooker 1 is fully vented; In order to remove the lid 3 from the pot 2 after the cooker 1 is depressurized and vented, the button 65 is pressed down farther (or a second time) to its second position show in FIG. 8. As the button is pushed down to its second position, the following occurs:

(m) the lower end 71 of the longer downward extending leg 70 of the button 65 comes into contact with the upper portion 40 of the stopbar 35 and forces the upwardly spring-biased stopbar 30 downward into the slot 30 against the spring biasing of stopbar 35, thus unlocking the lid 3 from the pot 2.

When the lid 3 is unlocked from the pot 2 and the button 65 is continuously held in its second position, the lid 3 may be rotated counterclockwise to place it in a position where it may be removed from the pot 2. When the lid 3 is so rotated counterclockwise, the following occurs:

(n) the downward extending guide post 145 of the lockguide 140 slides along the curved edge 26 of the guide groove 25 in a direction opposite to that in which it slid when the lid 3 was being installed on the pot 3, and as a result, the inwardly biased lockguide 140 moves inward (See FIG. 9);

(o) the latchdogs 170 and 175 of the lockguide 140 move inward with the lockguide 140 and are no longer positioned directly below or under the latch arms 80 and 95 of the downward extending legs 70 and 85, respectively, of the button 65, thus allowing the upwardly spring-biased button 65 to return to its original position above its first position and, at the same time, resetting the latch arms 80 and 95 to their original positions above latch dogs 170 and 175;

(p) the push post 155 moves inward with the lockguide 140 and moves inward and through the hole 160 in the rim 115 of the lid 3, where it contacts the flexible seal 119 and pushes the flexible seal 119 away from the rim 115, thus breaking the sealing action of the seal and allowing any remaining pressurized air or steam to escape from the pot 2; and (q) the upper surfaces 118 of the lower bent ends 117 of the scalloped portions 116 of the lid 3 sliding move counterclockwise out of contact with the lower surfaces 6 of the flanges 5 of the rim 4 of the pot 2, whereupon the lid 3 may be lifted off of the pot 2.

It is to be understood that while certain forms of the present invention have been illustrated and described herein, it is not to be limited to the specific forms or arrangement of parts described and shown.

What is claimed is as follows:

1. A pressure release handle assembly for a pressure cooker having a pot, a lid securable to the pot, and a pressure release valve having an activation pin or plunger, said pressure release handle assembly comprising:

a handle body securable to the lid, said handle body having a lock guide slidably mounted in a cavity formed in said handle body;

a button movably connected to said handle body, said button having a flexible leg extending therefrom, said leg having a first latch extending therefrom, and said button further having a tab extending therefrom, said tab being located adjacent to the activation pin of the pressure release valve;

a second latch formed on said lock guide, said second latch positioned on said lock guide such that said first latch may pass by said second latch when said button is moved, but may not return past said second latch in the opposite direction;

whereby, when said button is moved to a first inward position, said tab contacts the pin or plunger of the pressure release valve and activates the pressure release valve continuously, said button being prevented by the second latch from moving back in the opposite direction to deactivate the pressure release valve.

2. The pressure release handle assembly as in claim 1 wherein:

said handle body is a first handle body;

said handle assembly further includes a second handle body securable to the pot, said second handle body having a groove formed thereon, said groove having a cam surface;

said lock guide further including a guide post extending outwardly from said first handle body through an elongate slot;

said guide post being received within said groove in said second handle body and biased toward said cam surface when the lid is secured to the pot; and moving said first handle body relative to said second handle body causes said cam surface to engage said guide pin and slide said guide pin and said lock guide against said bias, said sliding of said lock guide releasing said first latch from said second latch and allowing said button to move back in said opposite direction.

3. The pressure release handle assembly as in claim 1 wherein:

said handle body is a first handle body and said handle assembly further includes a second handle body securable to the pot; and said handle assembly further comprises a locking mechanism comprising:

a first slot formed in said first handle body in alignment with an end of said flexible leg;

a second slot formed in said second handle body; and a stopbar slidably mounted in said second slot and biased outwardly therefrom; whereby when the lid is secured to the pot, said first slot is aligned with said second slot and said stopbar extends into said first slot and thereby prevents movement of said first handle body relative to said second handle body; and when said button is moved past said first inward position to a second inward position, said end of said leg contacts said stopbar and pushes said stopbar back into said second slot so that the lid may be unsecured from the pot.

4. A locking handle for a pressure cooker having a pot and a lid that rotates onto the pot until the lid is sealed on the pot, said locking handle comprising:

a lower handle attached to the pot;

an upper handle attached to the lid;

one of said upper and lower handles forming a first slot;

a stopbar moveably received in said first slot, said stopbar having a first end portion moveable out of said first slot, said first end portion having a rounded side;

the other of said upper and lower handles having an edge and forming a second slot to receive said first end portion of said stopbar; said second slot being aligned with said stopbar when the lid is secured on the pot;

a button movably connected to said other handle, said button having a leg attached to and extending therefrom, said leg having an end positioned opposite said first end portion of said stopbar;

whereby, as the lid is rotated onto the pot, the edge of said other handle slides over said rounded side of said first end portion of said stopbar and pushes said stopbar into said first slot until the lid is in sealing position, whereupon the first end portion of said stopbar moves into said second slot and prevents said upper and lower handles from rotating with respect to one another; and whereby, when the button is moved, said end of said leg of said button contacts said first end portion of said stopbar and pushes said stopbar back into said first slot so that the lid my be rotated off of the pot.

5. The handle assembly as in claim 4 and further including a pressure release mechanism comprising:

a pressure relief valve mounted to said pressure cooker proximate said other handle and having a plunger extending outwardly therefrom; and a tab extending from said button, whereby when the button is moved, said tab contacts said plunger to release pressure from the cooker.

6. The handle assembly as in claim 5 wherein:

said leg includes a first latch extending therefrom, said other handle includes a second latch positioned on said handle such that said first latch may pass by said second latch when said button is moved, but may not return past said second latch in the opposite direction;

whereby, when said button is moved to a first inward position, said tab contacts the plunger of the safety relief valve and activates the safety relief valve continuously, being prevented by the second latch from moving back in the opposite direction to deactivate the safety relief valve.

7. The pressure release handle assembly as in claim 6 wherein:

said one handle has a groove formed therein, said groove having a cam surface;

said second latch is formed on a lock guide slidably mounted in a cavity formed in said other handle, said lock guide further including a guide post extending outwardly from said other handle through an elongate slot; said guide post being received within said groove in said one handle and biased toward said cam surface when the lid is secured to the pot; and moving said other relative to said one handle causes said cam surface to engage said guide pin and slide said guide pin and said lock guide against said bias, said sliding of said lock guide releasing said first latch from said second latch and allowing said button to move back in said opposite direction.

8. A pressure cooker handle assembly for a pressure cooker having a pot and a lid securable thereto, the lid having a safety relief valve mounted therein, the relief valve having un upwardly extending plunger, said handle assembly comprising:

a lower handle attachable to the pressure cooker pot, said lower handle forming a slot and having a stopbar moveably received in said slot, said stopbar being biased upward in said slot so that an upper portion thereof extends above said slot; said upper portion of said stopbar having a rounded side and a straight side;

an upper handle attachable to the pressure cooker lid, said upper handle forming a bottom slot and an inner cavity for receiving a moveable lock guide said lock guide having a latch dog extending from a side thereof; said upper handle further having a button moveably secured in an upper opening of said upper handle, said button having a downward extending tab and a downward extending leg having a latch arm; whereby when said upper and lower handles are attached to the lid and pot respectively and the lid is placed on the pot and said upper handle is rotated in a first direction toward a position immediately above said lower handle, an edge of said upper handle slidingly contacts said curved edge of said stopbar, pressing said stopbar downward into said slot in said lower handle and permitting said top handle to continue to rotate to said position immediately above said lower handle, in which said position:

said bottom slot of said upper handle is aligned above said stopbar, and said stopbar is biased up into said bottom slot of said upper handle, preventing said upper handle from rotating out of alignment above said lower handle;

said tab of said button is aligned immediately above the plunger of the safety relief valve;

and said downward extending leg of said button is aligned immediately above said stopbar;

when said button is pressed downward a first time, said tab of said button presses the plunger of the safety relief valve, releasing pressure in the cooker; and when said button is pressed downward a second time, said downward extending leg of said button pushes said stopbar of said lower handle down into said slot in said lower handle, permitting said upper handle and said lid to be rotated in a direction opposite said first direction away from and out of alignment immediately above said lower handle so that said lid can be removed from said pot.

9. A pressure cooker comprising:

a lid securable to a pot; said lid having a rim, said rim defining a hole and having two laterally extending posts connected thereto;

a safety relief valve connected to said lid, said safety relief valve having an activation plunger that activates said safety release valve when said plunger is pressed;

a lower handle connected to said pot, said lower handle defining a groove in a top surface thereof and a slot, a moveable stopbar spring biased upwardly through said slot in said lower handle, an upper handle attached to said lid, said upper handle defining an upper opening a button having a downward extending tab and downward extending legs, said button moveably installed in said upper opening in said upper handle; whereby as said upper handle and said lid are rotated toward a position immediately above said lower handle, said stopbar is pushed downward into said slot in said lower handle to permit said top handle to continue to rotate to a position immediately above said lower handle, and as said upper handle is further rotated to a position immediately above said lower handle, said first bottom slot of said upper handle is aligned above said stopbar, and said stopbar is biased up into said first bottom slot of said upper handle, preventing said upper handle from rotating out of alignment above said lower handle;

said tab of said button is aligned immediately above said plunger of said safety relief valve; and said downward extending leg of said button is aligned immediately above said stopbar;

whereby, when said button is pressed downward a first time, said tab of said button presses the plunger of the safety relief valve, releasing the pressure in the cooker;

and when said button is press downward a second time, said downward extending leg of said button pushes said stopbar of said lower handle down into said slot in said lower handle to permit said upper handle and said lid to be rotated out of alignment immediately above said lower handle so that said lid can be removed from said pot.

10. A handle assembly for a pressure cooker having a safety relief valve, said handle assembly comprising:

a lower handle having a stopbar moveably secured in a slot in said lower handle, said stopbar being biased upward by a spring, an upper handle having:

a button moveably secured, and spring biased upward, in an opening formed in said upper handle; said button having a downward extending tab and a downward extending leg; said leg having a latch arm extending from a side thereof; and a lock guide moveably secured in an internal cavity of said upper handle, said lock guide having a latch dog extending from a side thereof whereby when said upper handle is positioned immediately above said lower handle, said downward tab of said button is aligned immediately above an activating plunger of the safety relief valve, an end of said downward extending leg is aligned immediately above said stopbar, said latch arm is aligned immediately above said latch dog, said slot in said upper handle is aligned immediately above said stopbar, and said stopbar is biased upward into said slot in said upper handle;

when said button is pressed downward a first time, said downward extending tab presses said plunger of said safety relief valve, releasing pressure in said pressure cooker, and said latch arm moves past said latch dog preventing said button from returning upward; and when said button is pressed downward a second time, said end of said downward extending leg of said button pushes the stopbar down into said slot in said lower handle so said upper handle can be moved out of alignment with said lower handle and said lid can be removed from said pot.

* * * * *